(12) United States Patent
Yu

(10) Patent No.: US 10,112,366 B2
(45) Date of Patent: Oct. 30, 2018

(54) ALUMINUM THERMOPLASTIC COMPOSITE MATERIAL

(71) Applicant: Triforce Luggage, LLC, Miami, FL (US)

(72) Inventor: Shibing Yu, Jiaxing (CN)

(73) Assignee: Triforce Luggage, LLC, Miami, FL (US)

( * ) Notice: Subject to any disclaimer, the term of this patent is extended or adjusted under 35 U.S.C. 154(b) by 127 days.

(21) Appl. No.: 14/974,045

(22) Filed: Dec. 18, 2015

(65) Prior Publication Data

US 2016/0207281 A1  Jul. 21, 2016

Related U.S. Application Data

(60) Provisional application No. 62/094,636, filed on Dec. 19, 2014.

(51) Int. Cl.
*A45C 5/02* (2006.01)
*B32B 3/26* (2006.01)
(Continued)

(52) U.S. Cl.
CPC ........... *B32B 7/02* (2013.01); *A45C 5/02* (2013.01); *A45C 5/14* (2013.01); *A45C 13/36* (2013.01);
(Continued)

(58) Field of Classification Search
CPC . A45C 5/02; A45C 2200/10; A45C 2005/032; A45C 2005/037; A45C 5/03; A45C 5/14; Y10T 428/24868; Y10T 428/24901; Y10T 428/24876; Y10T 428/24917; Y10T 428/24479; Y10T 428/24537; Y10T 428/24545; Y10T 428/2457; Y10T 428/24529; Y10T 428/24711; Y10T 428/24694; B32B 1/00;
(Continued)

(56) References Cited

U.S. PATENT DOCUMENTS

| | | | |
|---|---|---|---|
| 3,885,246 A * | 5/1975 | Tung ...................... | A42B 3/061 2/412 |
| 4,405,676 A * | 9/1983 | Pohl ........................ | B44C 1/14 359/580 |

(Continued)

*Primary Examiner* — Catherine A. Simone
(74) *Attorney, Agent, or Firm* — Greenberg Traurig, LLP; Chinh H. Pham; Todd C. Basile

(57) ABSTRACT

A composite comprising a first layer formed of a transparent or translucent plastic material; a second layer formed of a semi-rigid or rigid plastic material; and a third layer, securely positioned between the first and second layers, formed of a material having reflective properties on at least a side facing the first layer. A method for forming a composite comprising providing a first transparent or translucent plastic material, a second semi-rigid or rigid plastic material, and a third material having reflective properties on at least one side; positioning the first material adjacent the at least one side of the third material having reflective properties and the second material on an opposing side of the foil material; and heating the first material and the second material to a temperature of between about 110° C. and about 130° C. to form a bond between the first material, the second material, and the third material.

40 Claims, 11 Drawing Sheets

(51) Int. Cl.
   *B32B 3/30* (2006.01)
   *B32B 15/08* (2006.01)
   *B32B 15/20* (2006.01)
   *B32B 27/08* (2006.01)
   *B32B 7/02* (2006.01)
   *B32B 37/04* (2006.01)
   *B29C 51/00* (2006.01)
   *B32B 27/30* (2006.01)
   *B32B 27/32* (2006.01)
   *B32B 27/36* (2006.01)
   *B32B 1/00* (2006.01)
   *B32B 3/06* (2006.01)
   *A45C 5/14* (2006.01)
   *A45C 13/36* (2006.01)
   *B32B 38/06* (2006.01)
   *B32B 38/18* (2006.01)

(52) U.S. Cl.
   CPC ............... *B29C 51/00* (2013.01); *B32B 1/00* (2013.01); *B32B 3/06* (2013.01); *B32B 3/26* (2013.01); *B32B 3/30* (2013.01); *B32B 15/08* (2013.01); *B32B 15/20* (2013.01); *B32B 27/08* (2013.01); *B32B 27/302* (2013.01); *B32B 27/304* (2013.01); *B32B 27/308* (2013.01); *B32B 27/32* (2013.01); *B32B 27/36* (2013.01); *B32B 37/04* (2013.01); *B32B 38/06* (2013.01); *B32B 38/1866* (2013.01); *B32B 2270/00* (2013.01); *B32B 2274/00* (2013.01); *B32B 2307/402* (2013.01); *B32B 2307/4023* (2013.01); *B32B 2307/412* (2013.01); *B32B 2307/414* (2013.01); *B32B 2307/416* (2013.01); *B32B 2307/546* (2013.01); *B32B 2307/732* (2013.01); *B32B 2309/02* (2013.01); *B32B 2309/04* (2013.01); *B32B 2309/14* (2013.01); *B32B 2311/24* (2013.01); *B32B 2439/00* (2013.01); *B32B 2439/40* (2013.01)

(58) Field of Classification Search
   CPC .... B32B 3/06; B32B 3/26; B32B 3/30; B32B 3/28; B32B 15/08; B32B 15/20; B32B 2307/402; B32B 2307/412; B32B 2307/414; B32B 2307/416; B32B 2307/4026; B32B 2307/404; B05D 5/06; B05D 5/068
   See application file for complete search history.

(56) References Cited

U.S. PATENT DOCUMENTS

| | | | |
|---|---|---|---|
| 5,219,075 A * | 6/1993 | White | A45C 5/02 150/162 |
| 6,305,028 B1 * | 10/2001 | Lin | A42B 3/061 2/200.1 |
| 2001/0010838 A1 * | 8/2001 | Eldon | B05D 5/06 427/385.5 |

* cited by examiner

FIGURE 1A      FIGURE 1B

ALUMINUM THERMOPLASTIC COMPOSITE MATERIAL

CROSS-REFERENCE TO RELATED APPLICATION

This application claims priority to U.S. Provisional Application Ser. No. 62/094,636, filed Dec. 19, 2014, the disclosure of which is hereby incorporated herein by reference in its entirety.

BACKGROUND

Many materials, such as those used in luggage, lack a lightweight, durable, and aesthetically pleasing construction. There is a need for a material or materials exhibiting a combination of these qualities.

SUMMARY

The present disclosure is directed to a material comprising a first layer formed of a transparent or translucent plastic material; a second layer formed of a semi-rigid or rigid plastic material; and a third layer, securely positioned between the first and second layers, formed of a material having reflective properties on at least a side facing the first layer. In an embodiment, the composite may be used to form a main body section of a piece of luggage or other container.

The transparent or translucent plastic material of the first layer, in various embodiments, may include one of polyethylene terephthalate (PET), polyvinyl chloride (PVC), polystyrene (PS), polyethylene (PE), and acrylonitrile butadiene styrene (ABS), or a combination thereof. In various embodiments, the first layer may be between about 0.07 mm and 0.15 mm thick. The first layer may be sufficiently transparent or translucent to allow light to penetrate through the first plastic layer and reflect off of the third foil layer. The semi-rigid or rigid plastic material of the second layer, in various embodiments, may include one of polypropylene (PP), polyvinyl chloride (PVC), polystyrene (PS), polyethylene terephthalate (PET), and acrylonitrile butadiene styrene (ABS), or a combination thereof. In various embodiments, the second layer may be between about 0.1 mm and about 2 mm thick. The third layer, in various embodiments, may be between about 0.05 mm and 0.25 mm thick.

The composite, in various embodiments, may further comprise a fourth layer formed from a transparent or translucent colored material. The fourth layer, in various embodiments, may be disposed between the third layer and the first layer. In an embodiment, transparent or translucent colored material of the fourth layer is a plastic film. In an embodiment, the fourth layer may be about 0.03 mm thick. The fourth layer may be sufficiently transparent or translucent to allow light to penetrate through the fourth color layer and reflect off of the third foil layer.

The composite, in various embodiments, may be substantially planar in cross-section, or may have a patterned cross-section. In an embodiment, the patterned cross-section may be latticed. In another embodiment, the patterned cross-section may be defined by a series of alternating peaks and valleys on at least one side of the composite.

In another aspect, the present disclosure is direct to a method for manufacturing a composite comprising providing a first transparent or translucent plastic material, a second semi-rigid or rigid plastic material, and a third material having reflective properties on at least one side; positioning the first material adjacent the at least one side of the third material having reflective properties and the second material on an opposing side of the foil material; and heating the first material and the second material to a temperature of between about 110° C. and about 130° C. to form a bond between the first material, the second material, and the third material. In an embodiment, the method may include manufacturing a main body of a piece of luggage or other container from the composite.

In an embodiment, prior to the step of positioning, the first material and the third material may be placed in contact and exposed to about 220° C. for about 1 minute per meter of material. The step of positioning, in an embodiment, may further include positioning a fourth transparent or translucent colored material between the first material and the third material. The step of heating the first material and the second material to a temperature of between about 110° C. and about 130° C., in an embodiment, may be performed for about three minutes per meter of material. The method, in an embodiment, may further include the step of maintaining the heated materials at about 110° C. for about 48 hours. In various embodiments, the method may further comprise imparting a pattern into the composite.

DETAILED DESCRIPTION

Embodiments of the present disclosure provide a durable, lightweight material that can be used in a wide variety of products.

Composite 100

FIG. 1A illustrates a cross-sectional view of an exemplary composite 100 according to various aspects of the disclosure. Composite 100, in various embodiments, may generally include a thermoplastic film layer (TFL) 1 and a layer 2 formed of a plastic material.

Figure 1:
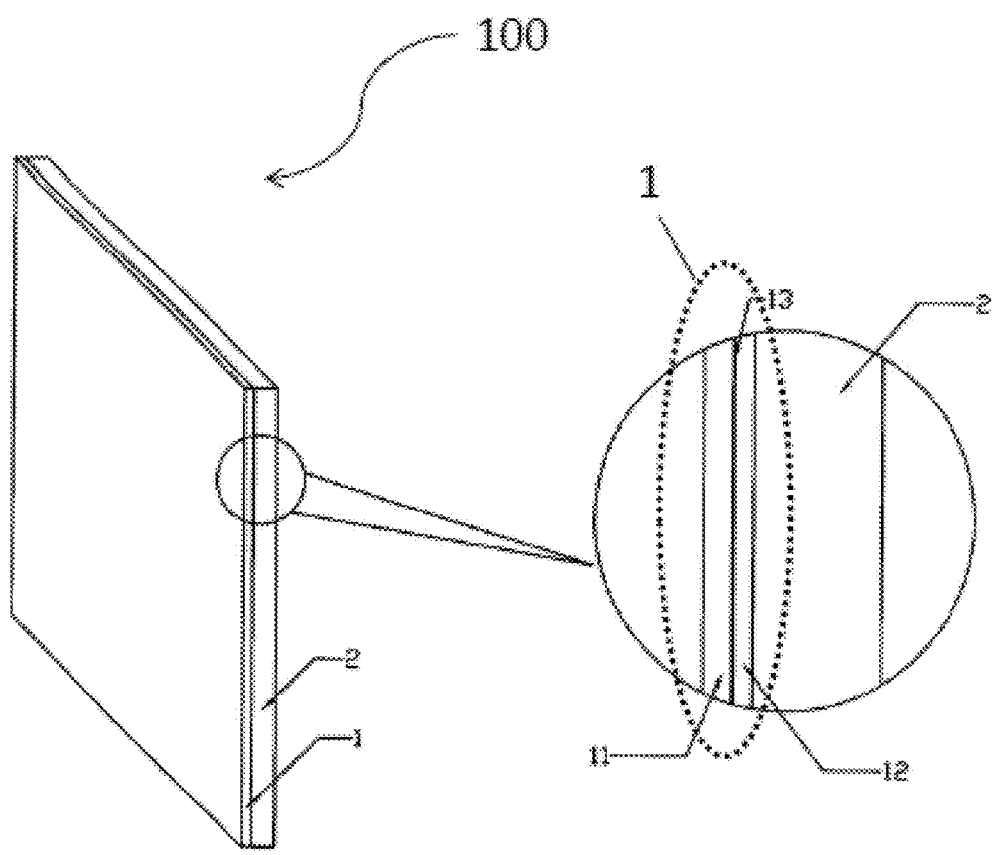
FIG. 1A depicts a cross-sectional view of a composite, in accordance with an embodiment of the present disclosure.
FIG. 1B depicts a close-up cross-sectional view of a thermoplastic foil layer of the composite of FIG. 1A, in accordance with an embodiment of the present disclosure.

FIG. 1B illustrates a close-up view of the exemplary composite 100, and shows further detail regarding the construction of TFL 1. TFL 1, in various embodiments, may generally comprise a layer 11 formed from a plastic material, a layer 12 formed from a foil material, and a layer 13 formed from a colored material. As shown in FIG. 1, in various embodiments, plastic layer 11 may form an outer surface of TFL 1. Foil layer 12 may be situated on an opposing side of plastic layer 11 and may form an opposing outer surface of TFL 1. Color layer 13 may optionally be included in TFL 1, and in an embodiment, may be situated between plastic layer 11 and foil layer 12.

It should be recognized that, while from time to time, plastic layer 11, foil layer 12, and color layer 13 may be associated with one another throughout the specification in the context of forming TFL 1 of composite 100, the present disclosure is not intended to be limited only to embodiments where these layers are necessarily combined to first form a distinct material such as TFL 1 that may be subsequently joined with plastic layer 2. Instead, any suitable construction is intended within the scope of the present disclosure.

Plastic layer 11, in various embodiments, may be formed from any suitable thermoplastic material such as, without limitation, polyethylene terephthalate (PET), polyvinyl chloride (PVC), polystyrene (PS), polyethylene (PE), acrylonitrile butadiene styrene (ABS), or any suitable combination thereof. In a preferred embodiment, plastic layer 11 may be formed from polyethylene terephthalate (PET). Plastic layer 11 may be of any suitable thickness for providing structural strength to TFL 1 and for protecting foil layer 12 and color layer 13 from damage. For example, in an embodiment, plastic layer 11 may have a thickness ranging between about 0.07 mm to 0.15 mm, but could be any other suitable thickness. In a preferred embodiment, plastic layer 11 may have a thickness of about 0.11 mm. In various embodiments, plastic layer 11 may be sufficiently transparent or translucent so as to allow light to penetrate through the plastic layer 11 and reflect off of foil layer 12.

Foil layer 12, in various embodiments, may be formed from a metallic foil material, such as an aluminum foil material. In various other embodiments, foil layer 12 may instead be formed from other suitable materials such as, without limitation, ABS, polycarbonate (PC), polyethylene (PET), O-phenylphenol (OPP), or any suitable a combination thereof. Foil layer 12 may be of any suitable thickness for reflecting at least a portion of any light that may penetrate plastic layer 11 and/or color layer 13. For example, in an embodiment, foil layer 12 may have a thickness ranging between about 0.05 mm to 0.25 mm, but could be any other suitable thickness. In a preferred embodiment, foil layer 12 may have a thickness of about 0.07 mm. In various embodiments, foil layer 12 may have reflective properties, and may be configured to provide visual texture to composite 100 in the way it reflects light that may penetrate through plastic layer 11 and/or color layer 13. Depending on the application, this can provide an aesthetic quality to composite 100, amongst other purposes. Although an aluminum foil material is provided as an illustrative example herein, any other material having reflective properties could be used to form foil layer 12.

Color layer 13, in various embodiments, may be formed from any suitable material having a colored property. In an embodiment, color layer 13 may be a plastic film. Ink or any other suitable substance may be used to impart color to color layer 13. Color layer 13 may be of any suitable thickness. For example, in a preferred embodiment, color layer 13 may have a thickness of about 0.03 mm. Color layer 13, in various embodiments, may be situated between plastic layer 11 and foil layer 12, as shown. In some embodiments, the color layer 13 may be sufficiently transparent or translucent to allow light to penetrate to foil layer 12, and thereby provide a colored effect to light reflecting off of foil layer 12 back through color layer 13 and plastic layer 11.

Plastic layer 2 of composite 100, in various embodiments, may be formed from any suitable thermoplastic material such as, without limitation, polypropylene (PP), polyvinyl chloride (PVC), polystyrene (PS), polyethylene terephthalate (PET), acrylonitrile butadiene styrene (ABS), or any suitable combination thereof. In a preferred embodiment, plastic layer 2 may be formed from polypropylene (PP). Plastic layer 2 may be of any suitable thickness for supporting TFL 1 and providing overall structural strength to composite 100. For example, in an embodiment, plastic layer 2 may have a thickness ranging between about 0.1 mm to about 2 mm, but could be any other suitable thickness. In a preferred embodiment, plastic layer 2 may have a thickness of about 1 mm. In an embodiment, plastic layer 2 may be made from the same material as plastic layer 11 of TFL 1.

Figure 2:
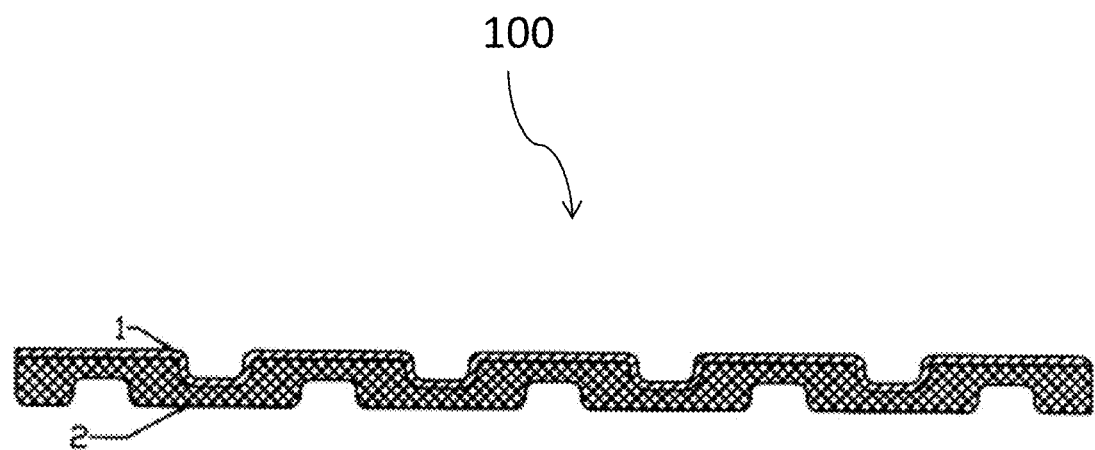
FIG. 2 depicts a cross-sectional view of a composite, in accordance with another embodiment of the present disclosure.
Figure 3:
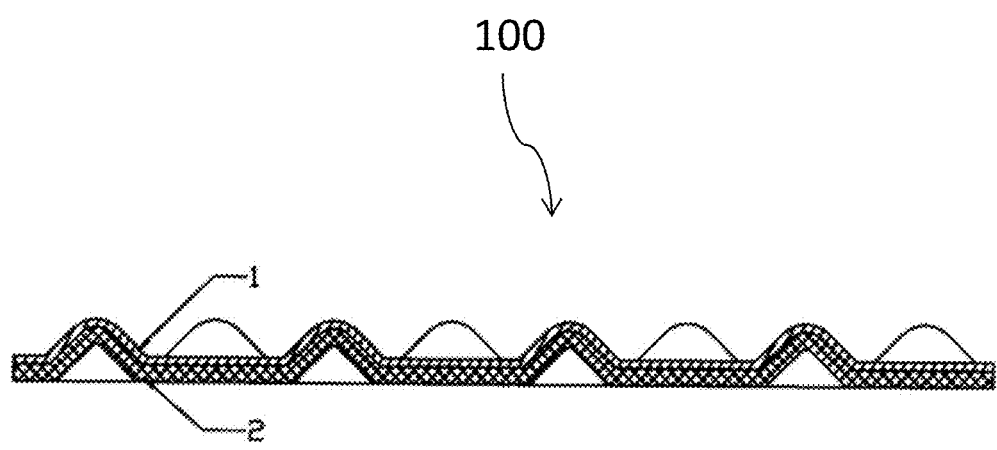
FIG. 3 depicts a cross-sectional view of a composite, in accordance with yet another embodiment of the present disclosure.
Figure 4:
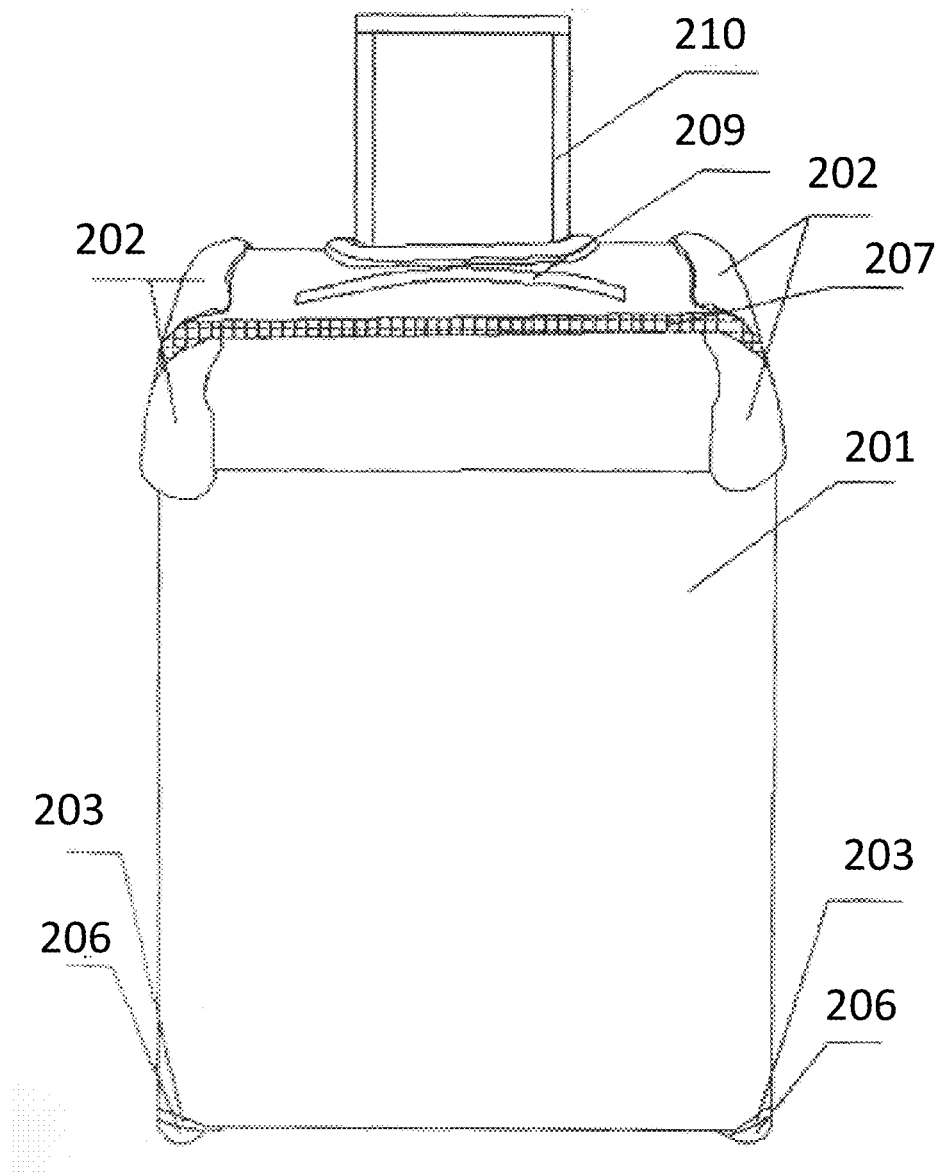
FIG. 4 depicts a front perspective view of a piece of luggage, in accordance with an embodiment of the present disclosure.
Figure 5:
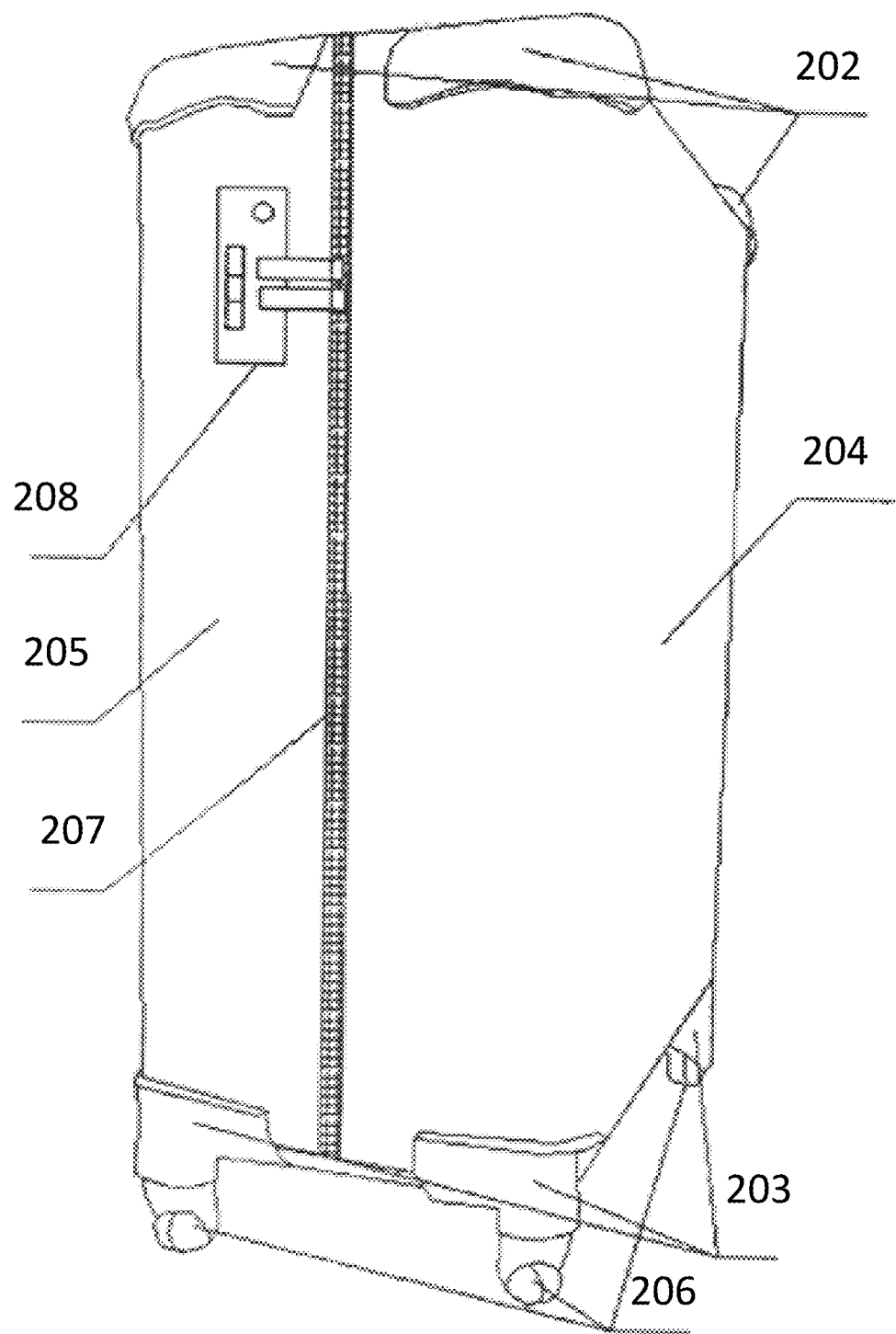
FIG. 5 depicts a rear perspective view of the piece of luggage of FIG. 4, in accordance with an embodiment of the present disclosure.
Figure 6:
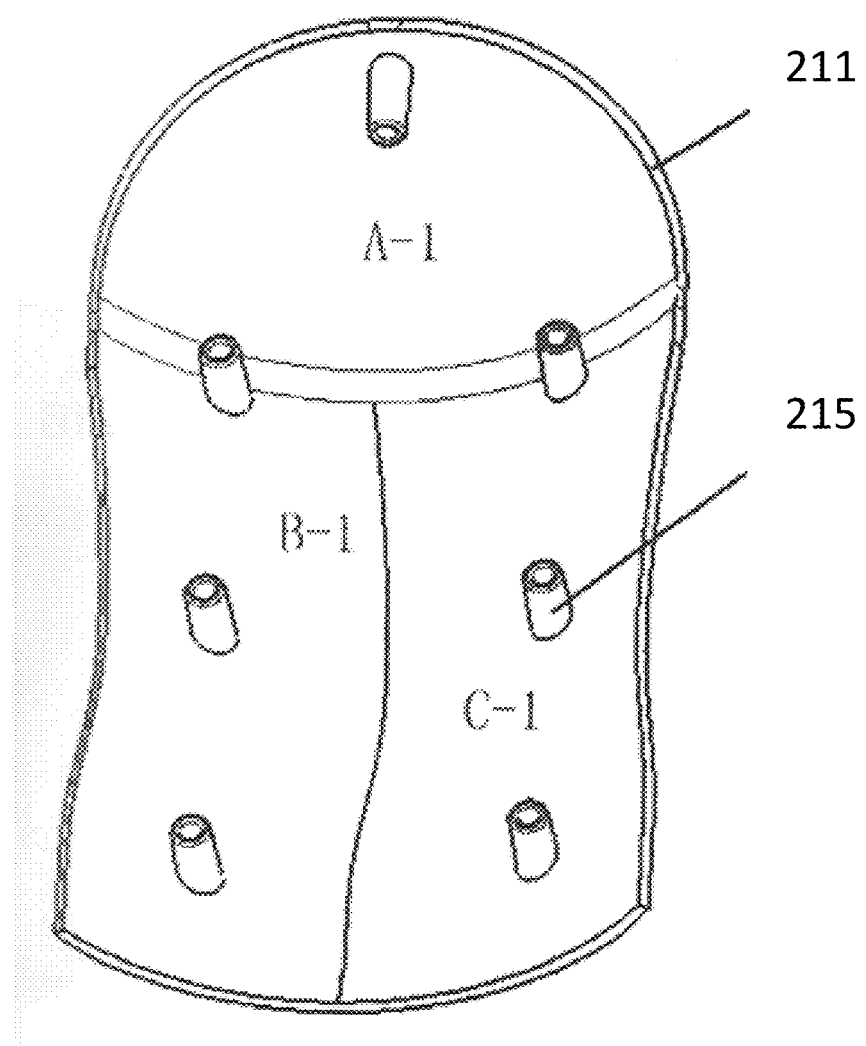
FIG. 6 depicts a first outer corner protection component of the piece of luggage of FIG. 4, in accordance with an embodiment of the present disclosure.
Figure 7:
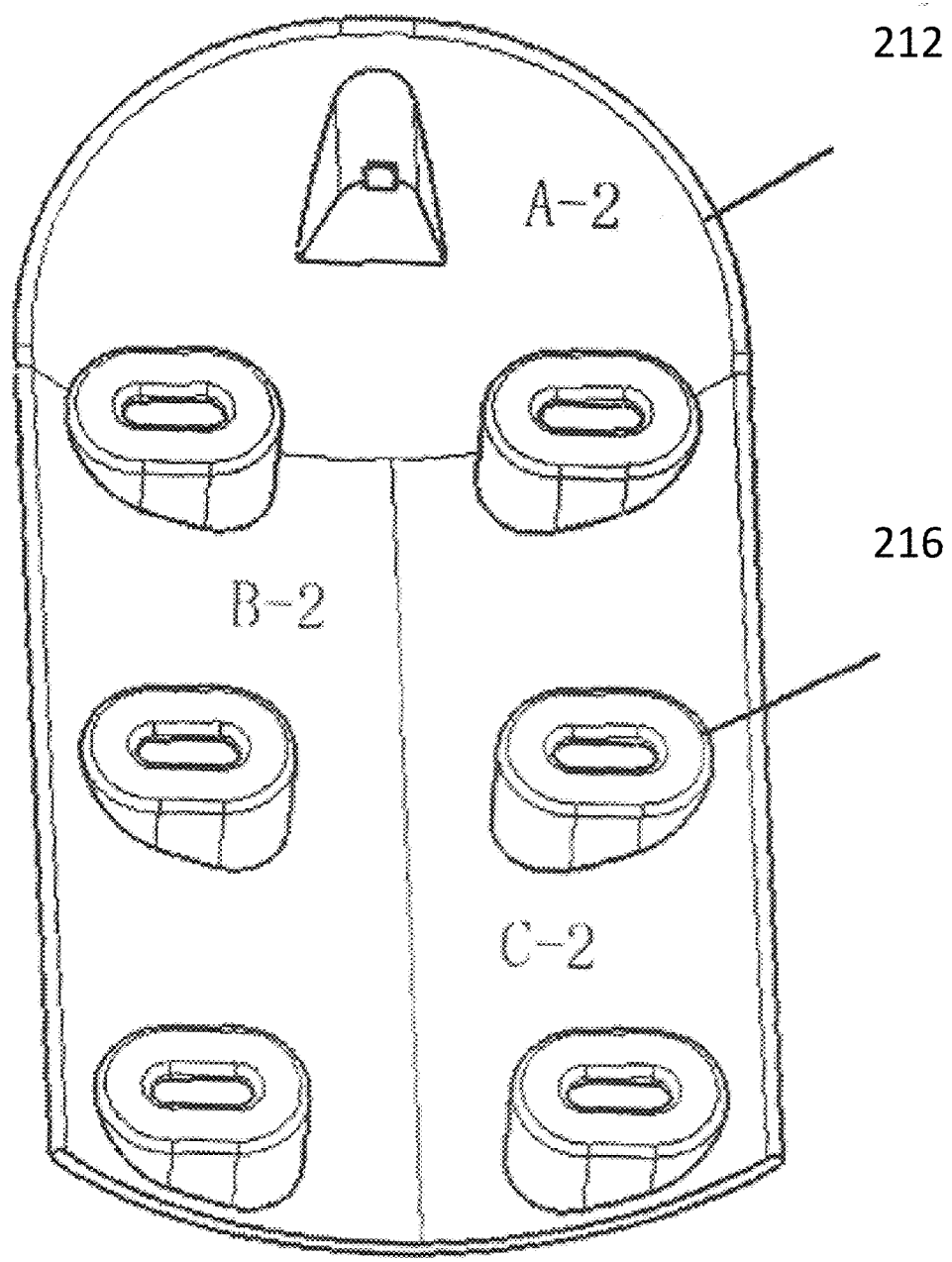
FIG. 7 depicts a first inner corner protection component of the piece of luggage of FIG. 4, in accordance with an embodiment of the present disclosure.

TFL 1 and plastic layer 2 of composite 100 may be formed in any desired size, shape, and configuration. FIG. 2 illustrates a cross-sectional view of an embodiment whereby TFL 1 and plastic layer 2 are configured in a convex/concave pattern such that composite 100 contains a series of alternating grooves (i.e. peaks and valleys) on either side. The grooves may be of any desired depth and width, and need not necessarily be uniform across the entire surface of composite 100. In some embodiments, the grooves on one side of composite 100 may also be of a different size, shape, and/or configuration than grooves on the other side of composite 100. In alternate embodiments, the grooves may be formed on just one side of composite 100. FIG. 3 illustrates another embodiment of composite 100, in which composite 100 is contains a latticed pattern. In the embodiment shown, composite 100 is shown as being latticed in an angle of 45°. The pattern on composite 100 can be likewise modified and configured according to a wide variety of desired visual effects and textures. Patterned embodiments of composite 100 may provide for enhancing any aesthetic visual effect created when light is reflected off of foil layer 12, and may further have the advantages of thickness, structural strength, durability, and can help provide an anti-slip surface.

Composite 100 may provide a number of advantages over other materials. In one aspect, plastic layer 2 not only provides mechanical strength to composite 100, but also may be waterproof, thereby protecting foil layer 12 from oxidation through that side of composite 100. Similarly, plastic layer 11, when configured as the opposing outer surface of composite 100, can protect foil layer 12 from oxidation as well. Composite 100 is also lightweight and very durable compared to other materials. In various embodiments, such characteristics may make composite 100 a favorable material for use in luggage products, amongst others.

Composite 100 may be manufactured in any suitable manner. In various embodiments, TFL 1 may be separately formed, and subsequently combined with plastic layer 2 to form composite 100. TFL 1 of composite 100 may be manufactured, in various embodiments, by arranging plastic layer 11, foil layer 12, and color layer 13 as previously described (i.e., 11-13-12), and exposing them to heat. In an embodiment, this may be done at a temperature of about 220° C.±10° C. for about 1 minute/meter. Of course, exposure may be at any other suitable temperature, for any other suitable amount of time, and any suitable combination thereof. In various embodiments, the three layers 11, 12, 13 may also be pressed together during and/or after heating to help form TFL 1. In an embodiment, a force ranging between about 30 kg and 50 kg may be applied to the layers during this pressing step. Afterwards, the combined layers 11, 12, 13 may be kept at about 70° C. for about 48 hours to complete the combination process. It should be recognized that this finishing step may be accomplished at other suitable combinations of temperature and time as well.

TFL 1 and plastic layer 2 may then be placed in contact and exposed to heat to join these materials. In an embodiment, this may be done at a temperature of about 120° C.±10° C. for about 3 minute/meter. In various embodiments, TFL 1 and plastic layer 2 may also be pressed together during and/or after heating to help form composite 100. In an embodiment, a force ranging between about 30 kg and about 50 kg may be applied to TFL 1 and plastic layer 2 during this pressing step. Afterwards, the combined TFL 1 and plastic layer 2 may be kept at about 70° C. for about 48 hours to complete the process of forming composite 100.

In various other embodiments, rather than forming composite 100 in the aforementioned piecemeal manner (i.e., form TFL 1, then join TFL 1 with plastic layer 2), composite 100 may be formed by combining layers 11, 12, 13, and 2 at once. One of ordinary skill in the art will recognize, in light of the above disclosure, suitable temperatures, durations, and pressures for providing such a combination.

Figure 11:
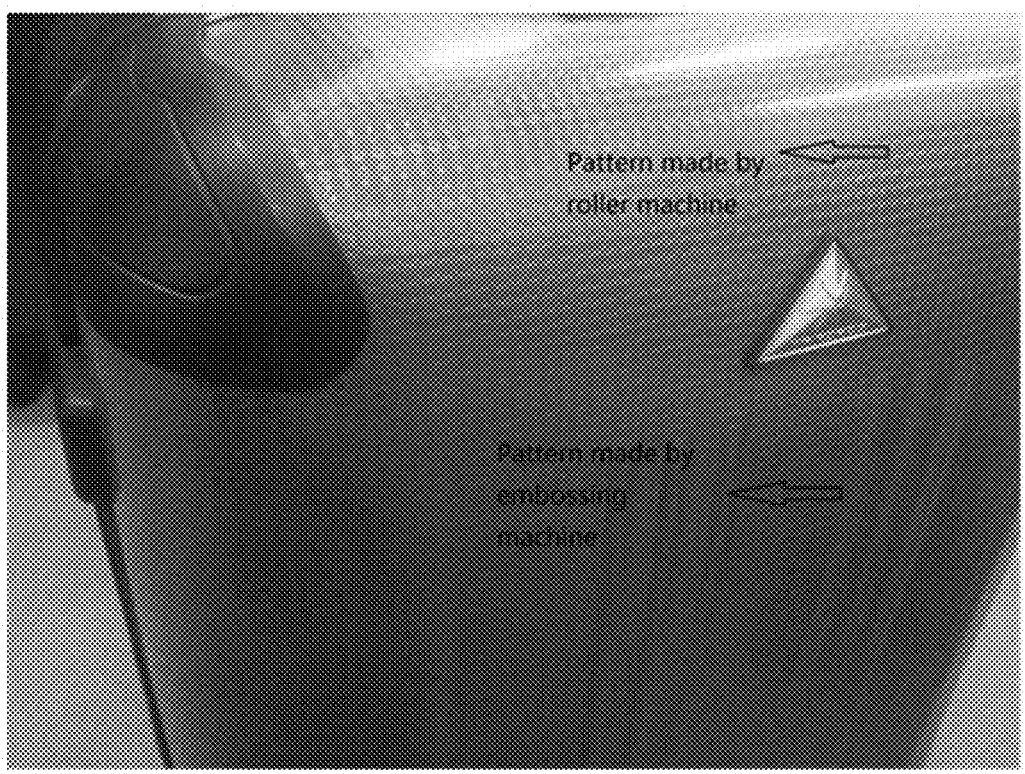
FIG. 11 depicts a piece of luggage having a main body formed of a patterned composite, in accordance with an embodiment of the present disclosure.

Referring back to FIGS. 2 and 3, composite 100 may be manufactured with various shapes in any suitable manner. In various embodiments, composite 100 may be formed against a mold to impart a given shape, such as the previously described grooved and latticed shapes. In another embodiment, composite 100 may be stamped at some point during the heating process to impart a given shape. Various patterns may also be imparted to composite 100 during or after its formation. Such patterns may serve to increase the intensity and thickness of the material and also provide anti-slip properties to the material. In an embodiment, a pattern may be imparted in the material using a roller machine or an embossing machine. In an embodiment, patterns may be applied to composite 100 under high temperature (e.g., 120° C.±10° C.). Exemplary patterns on luggage made with composite 100 are shown in FIG. 11, as later described.

Example 1—Luggage 200

Figure 8:
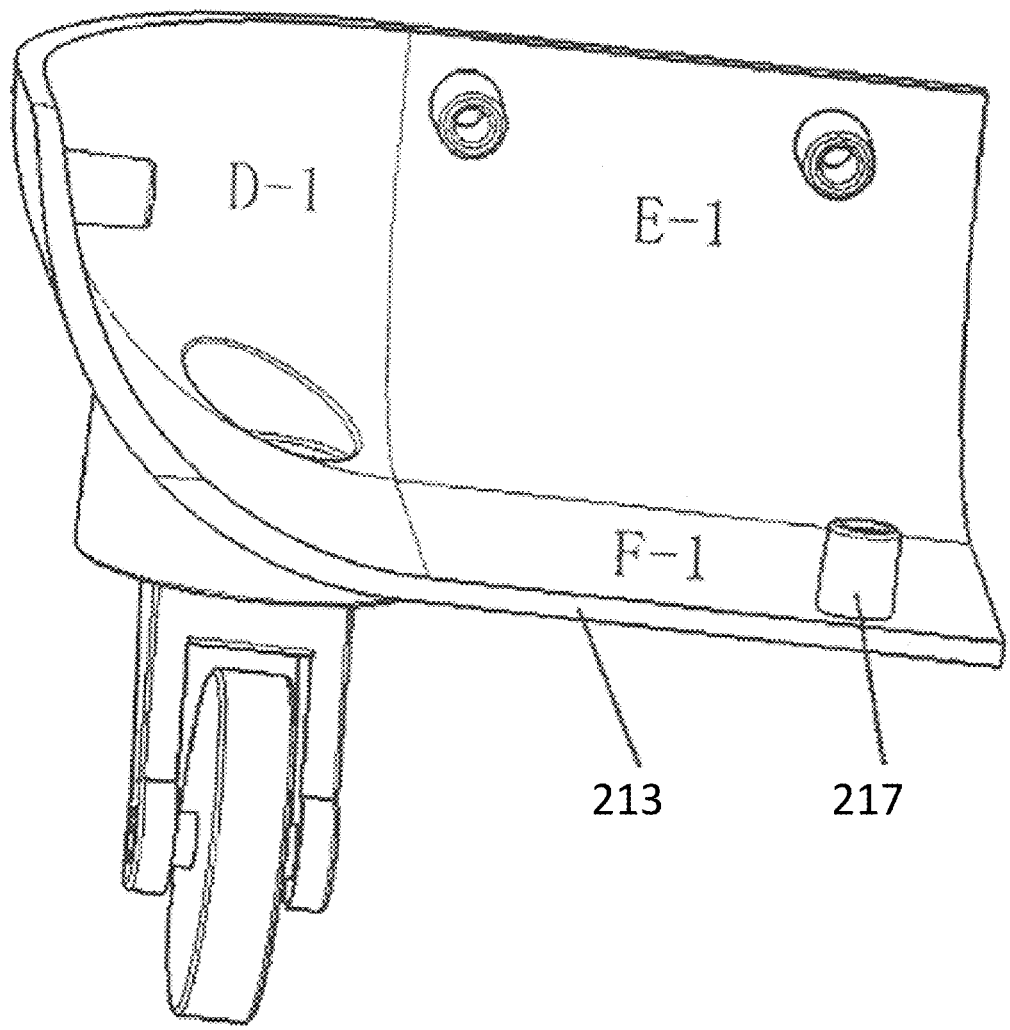
FIG. 8 depicts a second outer corner protection component of the piece of luggage of FIG. 4, in accordance with an embodiment of the present disclosure.
Figure 9:
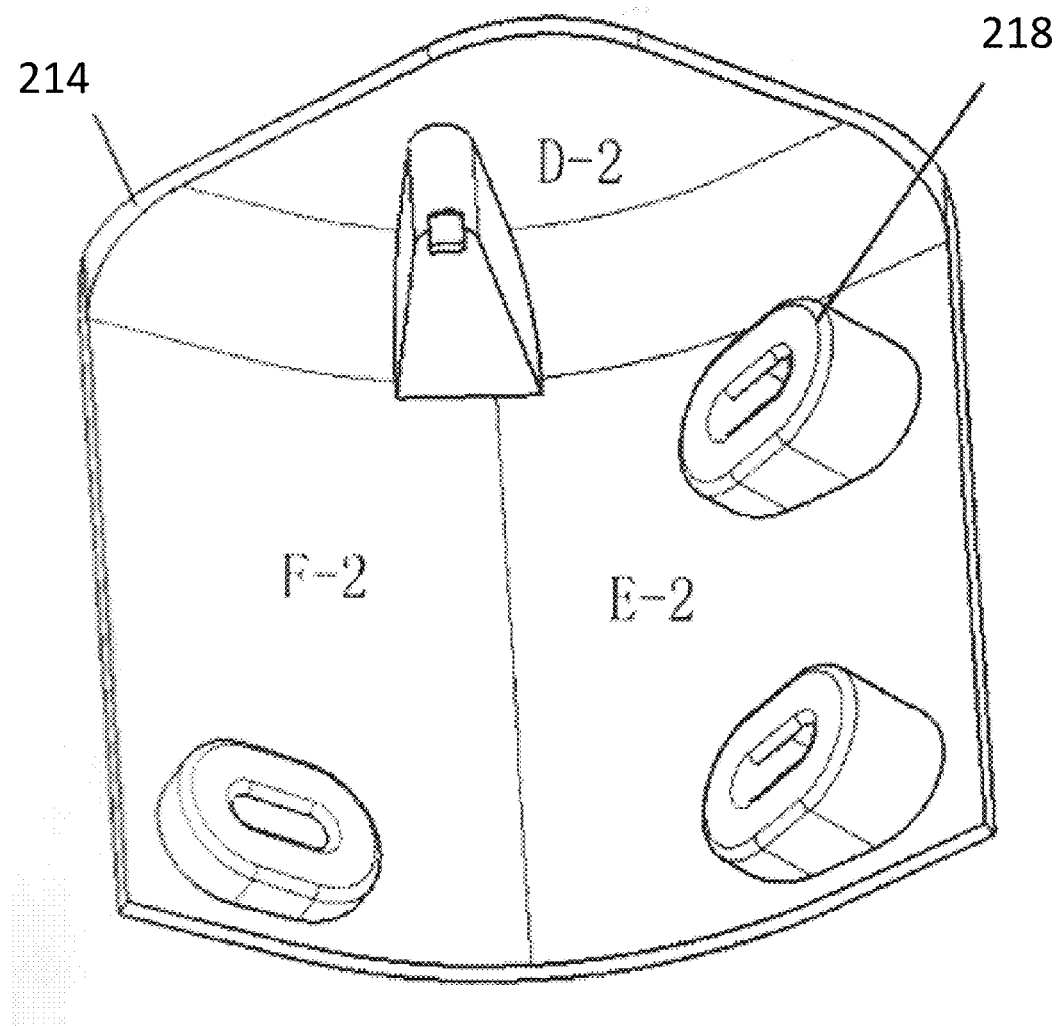
FIG. 9 depicts a second inner corner protection component of the piece of luggage of FIG. 4, in accordance with an embodiment of the present disclosure.
Figure 10:
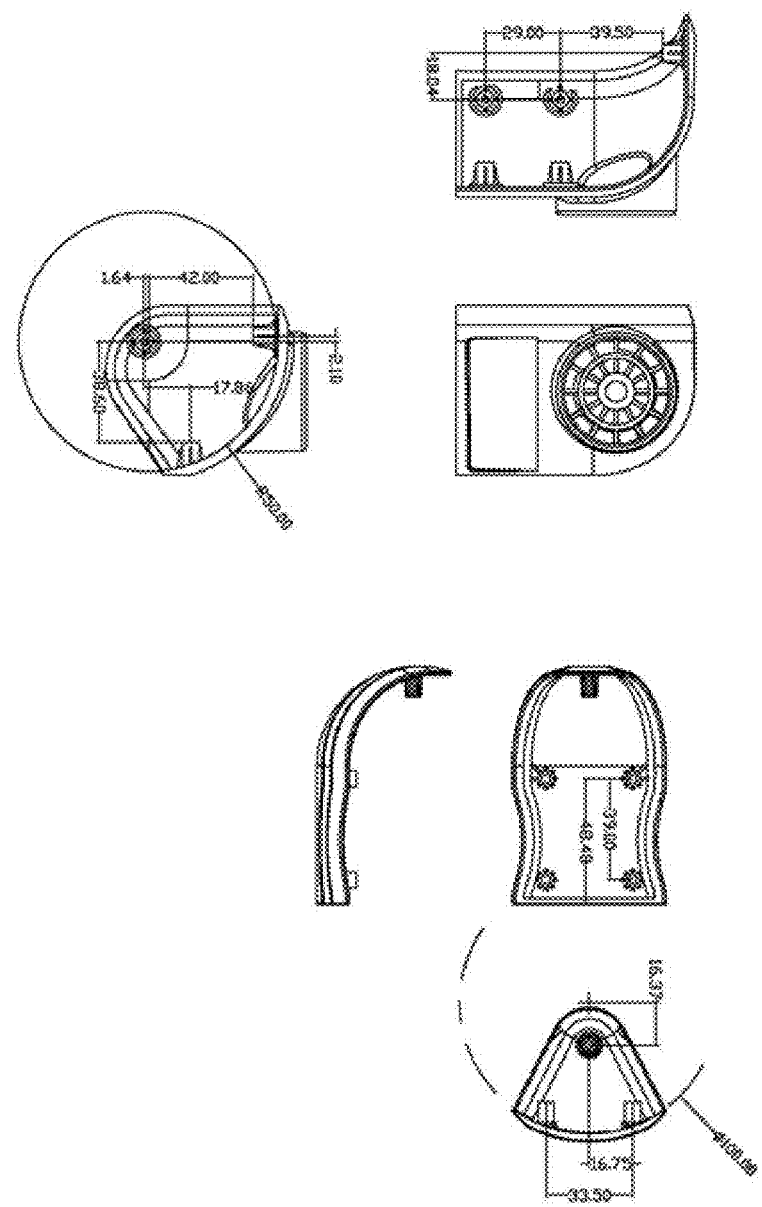
FIG. 10 depicts a corner protection and wheel assembly of the piece of luggage of FIG. 4, in accordance with an embodiment of the present disclosure.

FIGS. 4-11 illustrate embodiments of luggage 200 and luggage components according to various embodiments of the disclosure. In this example, the piece of luggage 200 includes a main body 201 comprising a left body 205 and right body 204 through zipper 207. There is the first extrusion forming section 202 at the upper four corners of the main body 201 and there is the second extrusion forming section 203 at the bottom four corners of the main body 201 and the first extrusion forming section 202 and second extrusion forming section 203 are fixed to the main body 201 by thread. The first extrusion forming two sections includes the first outer corner protection 211 outside the main body 201 and the related first inner corner protection 212 inside the main body 201. The second extrusion forming section 203 includes the second outer corner protection 213 outside the main body 201 and the related second inner corner protection 214 inside the main body 201 as shown in FIGS. 8 and 9.

There are seven first bolted caps 215 with internal thread inside the first outer corner protection 211 and there are seven first fixed legs 216 with holes related to the first bolted caps 215 inside the first inner corner protection 212. The first fixed leg 216 can be fixed by the bolt through the hole with the first bolted cap 215. The construction of the first outer corner protection 211 is in three directions, the first outer corner protection 211 includes in camber A-1, B-1 and C-1. There is one first bolted cap 215 on the camber A-1, there are three first bolted caps 215 with space on each of camber B-1 and camber C-1. The first inner corner protection 212 is with the related three direction construction to the first outer corner protection 211, the first inner corner protection 212 consists in camber A-2, B-2 and C-2. There is one first fixed leg 216 with hole on camber A-2 related to the first bolted cap 215 on camber A-1, there are three first fixed legs 216 with hole on each of camber B-2 and C-2 related to the first bolted caps 215 on camber B-1 and C-1.

There are three second bolted caps 217 with internal thread inside the second outer corner protection 213 and there are three second fixed legs 218 with holes related to the second bolted caps 217 inside the second inner corner protection 214. The second fixed leg 218 can be fixed by the bolt through the hole with the second bolted caps 217. The construction of the second outer corner protection 213 is in three directions, the second outer corner protection 213 consists in camber D-1, E-1 and F-1. There is one second bolted caps 217 on the camber D-1, there are two second bolted caps 217 with space on camber E-1 and there is one second bolted caps 217 on camber F-1. The second inner corner protection 214 is with the related three direction construction to the second outer corner protection 213, the second inner corner protection 214 consists in camber D-2, E-2 and F-2. There is one second fixed leg 218 with hole on camber D-2 related to the second bolted caps 217 on camber D-1, there are two second fixed legs 218 with hole on camber E-2 related to the second bolted caps 217 on camber E-1 and there is one second fixed legs 218 with hole on camber F-2 related to the second bolted caps 217 on camber F-1.

Through the occlusion of the bolted caps inside the first outer corner protection 211 and the second outer corner protection 213 to the related fixed legs on the first inner corner protection 212 and the second inner corner protection 214 and then the matched bolt, the outer corner protection and inner corner protection come together firmly. In some embodiments, the body of the luggage 200 can be shaped through extruding into a stereo structure, thus removing the need for any mold, and thereby helping to reduce the cost to produce the luggage 200.

Exemplary embodiments of such luggage 200 may also include a telescoping handle 210. Such luggage 200 may also include a lock 208 (such as a TSA-approved lock) on the main body 201 matching to the zipper 207. In some embodiments, a user can unlock the lock 208 using a password defined by the user or by using a key. In this example, the lock 208 is at the upper of one side of the left body 205 to provide easy access for locking and unlocking.

There are wheels 206 at the bottom of all the four second extrusion forming three of the main body 201 and they are mute omni-directional wheels. The 360° mute omni-directional wheels is strong enough for long term use and designed with reasonable height, it can disperse the weight easily without reducing the loads, it can also be rolled smoothly in rugged area. The handle 209 allows a user to carry the luggage 200 when on a surface not suitable for rolling.

A pattern or other markings may be formed or imparted to composite 100 included as part of the luggage 200. In the example of the luggage 200 shown in FIGS. 4-11, marks are made on both outside and inside corner of the plastic material first and then the first outer corner protection 211, the first inner corner protection 212, the second outer corner protection 213 and the second inner corner protection 214 are combined by the thread at the marked positions. The left body 205 and right body 204 can be shaped through extruding by this way into stereo structure. The main body 201 extruded into stereo structure in this way at the corners by the first extrusion forming section 202 and second extrusion forming section 203 can be done without molds and this can cut down the cost and in the meanwhile there is the corner protection at the first extrusion forming section 202 and second extrusion forming section 203, this can have the advantage of firm and the corners are not easy to deform.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The connecting lines shown in the various figures contained herein are intended to represent exemplary functional relationships and/or physical couplings between the various elements. It should be noted that many alternative or additional functional relationships or physical connections may be present in a practical system.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A composite comprising:
   a patterned outer surface, wherein the patterned outer surface is latticed or is defined by a series of alternating peaks and valleys on at least one side of the composite;
   a first layer formed of a transparent or translucent plastic material;
   a second layer formed of a semi-rigid or rigid plastic material;
   a third layer formed of a material having reflective properties on at least a side facing the first layer; and
   a fourth layer formed from a colored material, the fourth layer being positioned between and directly touching the third layer and the first layer,
   wherein the third layer is positioned between and directly touches the fourth layer and the second layer, and
   wherein the fourth layer is transparent or translucent in whole to allow light penetrating therethrough to irradiate the third layer, thereby providing a colored effect to light reflecting off of the third layer back through the fourth layer and the first layer;
   wherein the composite forms a main body section of a piece of luggage.

2. The composite of claim 1, wherein the transparent or translucent plastic material of the first layer includes one of polyethylene terephthalate (PET), polyvinyl chloride (PVC), polystyrene (PS), polyethylene (PE), and acrylonitrile butadiene styrene (ABS), or a combination thereof.

3. The composite of claim 1, wherein the first layer is between about 0.07 mm and 0.15 mm thick.

4. The composite of claim 1, wherein the semi-rigid or rigid plastic material of the second layer includes one of polypropylene (PP), polyvinyl chloride (PVC), polystyrene (PS), polyethylene terephthalate (PET), and acrylonitrile butadiene styrene (ABS), or a combination thereof.

5. The composite of claim 1, wherein the second layer is between about 0.1 mm and about 2 mm thick.

6. The composite of claim 1, wherein the third layer is between about 0.05 mm and 0.25 mm thick.

7. The composite of claim 1, wherein the colored material of the fourth layer is a transparent or translucent plastic film.

8. The composite of claim 1, wherein the fourth layer is about 0.03 mm thick.

9. The composite of claim 1, wherein the second layer is made from the same material as the first layer.

10. The composite of claim 1, wherein the third layer is configured to provide visual texture by reflecting light that penetrates through the first layer and the fourth layer.

11. The composite of claim 1, wherein the composite is latticed in an angle of 45 degrees.

12. The composite of claim 1, wherein the third layer is formed from a metallic foil material.

13. A composite comprising:
   a first layer formed of a transparent or translucent plastic material;
   a second layer formed of a semi-rigid or rigid plastic material;
   a third layer formed of a material having reflective properties on at least a side facing the first layer; and
   a fourth layer formed from a colored material, the fourth layer being positioned between and directly touching the third layer and the first layer,
   wherein the third layer is positioned between and directly touches the fourth layer and the second layer,
   wherein the fourth layer is transparent or translucent in whole to allow light penetrating therethrough to irradiate the third layer, thereby providing a colored effect to light reflecting off of the third layer back through the fourth layer and the first layer, and
   wherein the composite forms a main body section of a piece of luggage.

14. The composite of claim 13, wherein the transparent or translucent plastic material of the first layer includes one of polyethylene terephthalate (PET), polyvinyl chloride (PVC), polystyrene (PS), polyethylene (PE), and acrylonitrile butadiene styrene (ABS), or a combination thereof.

15. The composite of claim 13, wherein the first layer is between about 0.07 mm and 0.15 mm thick.

16. The composite of claim 13, wherein the semi-rigid or rigid plastic material of the second layer includes one of polypropylene (PP), polyvinyl chloride (PVC), polystyrene (PS), polyethylene terephthalate (PET), and acrylonitrile butadiene styrene (ABS), or a combination thereof.

17. The composite of claim 13, wherein the second layer is between about 0.1 mm and about 2 mm thick.

18. The composite of claim 13, wherein the third layer is between about 0.05 mm and 0.25 mm thick.

19. The composite of claim 13, wherein the colored material of the fourth layer is a transparent or translucent plastic film.

20. The composite of claim 13, wherein the fourth layer is about 0.03 mm thick.

21. The composite of claim 13, having a patterned outer surface.

22. The composite of claim 21, wherein the patterned outer surface is latticed or is defined by a series of alternating peaks and valleys on at least one side of the composite.

23. The composite of claim 13, wherein the second layer is made from the same material as the first layer.

24. The composite of claim 13, wherein the third layer is configured to provide visual texture by reflecting light that penetrates through the first layer and the fourth layer.

25. The composite of claim 21, wherein the patterned outer surface is defined by a series of alternating grooves on at least one side of the composite.

26. The composite of claim 25, wherein the grooves are nonuniform across the entire surface of the composite.

27. The composite of claim 22, wherein the composite is latticed in an angle of 45 degrees.

28. The composite of claim 13, wherein the third layer is formed from a metallic foil material.

29. A composite comprising:
   a patterned outer surface, wherein the patterned outer surface is defined by a series of alternating grooves on at least one side of the composite;
   a first layer formed of a transparent or translucent plastic material;
   a second layer formed of a semi-rigid or rigid plastic material;
   a third layer formed of a material having reflective properties on at least a side facing the first layer; and
   a fourth layer formed from a colored material, the fourth layer being positioned between and directly touching the third layer and the first layer,
   wherein the third layer is positioned between and directly touches the fourth layer and the second layer, and
   wherein the fourth layer is transparent or translucent in whole to allow light penetrating therethrough to irradiate the third layer, thereby providing a colored effect to light reflecting off of the third layer back through the fourth layer and the first layer;
   wherein the composite forms a main body section of a piece of luggage.

30. The composite of claim 29, wherein the grooves are nonuniform across the entire surface of the composite.

31. The composite of claim 29, wherein the transparent or translucent plastic material of the first layer includes one of polyethylene terephthalate (PET), polyvinyl chloride (PVC), polystyrene (PS), polyethylene (PE), and acrylonitrile butadiene styrene (ABS), or a combination thereof.

32. The composite of claim 29, wherein the first layer is between about 0.07 mm and 0.15 mm thick.

33. The composite of claim 29, wherein the semi-rigid or rigid plastic material of the second layer includes one of polypropylene (PP), polyvinyl chloride (PVC), polystyrene (PS), polyethylene terephthalate (PET), and acrylonitrile butadiene styrene (ABS), or a combination thereof.

34. The composite of claim 29, wherein the second layer is between about 0.1 mm and about 2 mm thick.

35. The composite of claim 29, wherein the third layer is between about 0.05 mm and 0.25 mm thick.

36. The composite of claim 29, wherein the colored material of the fourth layer is a transparent or translucent plastic film.

37. The composite of claim 29, wherein the fourth layer is about 0.03 mm thick.

38. The composite of claim 29, wherein the second layer is made from the same material as the first layer.

39. The composite of claim 29, wherein the third layer is configured to provide visual texture by reflecting light that penetrates through the first layer and the fourth layer.

40. The composite of claim 29, wherein the third layer is formed from a metallic foil material.

* * * * *